(No Model.)
H. L. ROOSEVELT, Dec'd.
A. ROOSEVELT, Executor.
GALVANIC BATTERY.
No. 393,395. Patented Nov. 27, 1888.
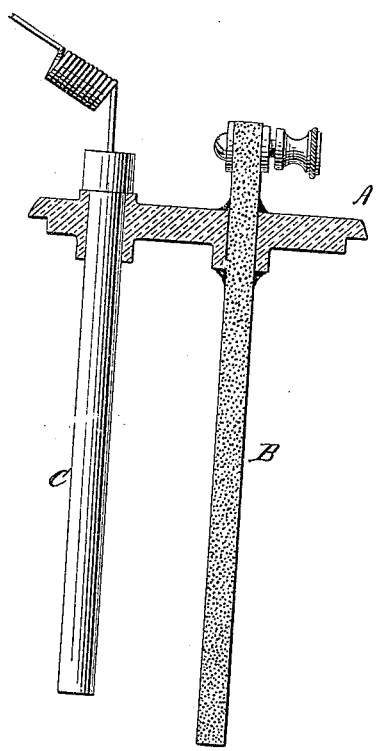
Witnesses:
Geo. W. Hiatt
Wm. A. Pollock
Inventor:
Hilborne L. Roosevelt,
By his Attorney
E. N. Dickerson Jr.

UNITED STATES PATENT OFFICE.

HILBORNE L. ROOSEVELT, OF NEW YORK, N. Y.; ALFRED ROOSEVELT EXECUTOR OF SAID HILBORNE L. ROOSEVELT, DECEASED.

GALVANIC BATTERY.

SPECIFICATION forming part of Letters Patent No. 393,395, dated November 27, 1888.

Application filed April 19, 1881. Serial No. 31,190. (No model.)

*To all whom it may concern:*

Be it known that I, HILBORNE L. ROOSEVELT, of the city, county, and State of New York, have invented a new and useful Improvement in Galvanic Batteries, of which the following is a full and true description, reference being had to the accompanying drawings.

My invention relates to a method of supporting both poles of a galvanic battery by means of an insulating vitreous cover applied to the jar of said battery. By this arrangement a separate holder or support for the poles is dispensed with and economy and simplicity of construction are obtained.

In my drawing, B may represent the electro-negative element of the battery, and C the zinc or positive element.

A represents an insulating vitreous cover or support adapted to fit the jar or vessel which receives the elements B C. This cover A should be made of insulating vitreous material. I prefer porcelain or glass. The elements may be arranged in this cover in different ways—as, for instance, they may, when in position, rest against the bottom of the jar and be simply supported laterally by the cover, or they may be hung in the cover in the manner shown in the drawing and removable with it, which latter method is the one which I prefer. They should be provided at their upper ends with suitable connections to carry off the electricity.

I am aware that glass stoppers previous to my invention have been used to seal closed voltameter-jars or gas-batteries. I do not claim such apparatus; but What I do claim as my invention, and desire to secure by Letters Patent, is—

A cover for a battery-cell composed of vitreous material provided with one or more openings for the passage of the electrodes and one or more electrodes extending through said openings and supported thereby, and provided with connectors outside the cover, whereby the deleterious effects of the fumes from the battery-fluid upon the connectors are avoided, substantially as described.

HILBORNE L. ROOSEVELT.

Witnesses:
ANTHONY GREF, Jr.,
WM. A. POLLOCK.